(12) United States Patent
Xia et al.

(10) Patent No.: US 8,135,247 B2
(45) Date of Patent: Mar. 13, 2012

(54) PACKAGED SENSORS AND HARSH ENVIRONMENT SYSTEMS WITH PACKAGED SENSORS

(75) Inventors: Hua Xia, Altamont, NY (US); James Michael Storey, Houston, TX (US); Aaron John Avagliano, Houston, TX (US); Aditya Kumar, Schenectady, NY (US); Kevin Thomas McCarthy, Troy, NY (US); Juntao Wu, Niskayuna, NY (US); Cheryl Zhan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 136 days.

(21) Appl. No.: 12/413,641

(22) Filed: Mar. 30, 2009

(65) Prior Publication Data

US 2010/0247026 A1   Sep. 30, 2010

(51) Int. Cl.
   *G02B 6/00* (2006.01)
   *G02B 6/34* (2006.01)
(52) U.S. Cl. ............... 385/13; 385/12; 385/37
(58) Field of Classification Search .............. 385/12, 385/13, 37
   See application file for complete search history.

(56) References Cited

U.S. PATENT DOCUMENTS

| | | | |
|---|---|---|---|
| 5,134,470 A * | 7/1992 | Ravetti | 385/98 |
| 5,280,172 A | 1/1994 | Di Bin et al. | |
| 5,496,997 A | 3/1996 | Pope | |
| 5,674,751 A | 10/1997 | Jaduszliwer et al. | |
| 6,009,216 A * | 12/1999 | Pruett et al. | 385/12 |
| 6,337,737 B1 * | 1/2002 | Chang et al. | 356/32 |
| 6,396,572 B1 * | 5/2002 | Chang et al. | 356/35.5 |
| 6,416,234 B1 * | 7/2002 | Wach et al. | 385/70 |
| 6,529,676 B2 | 3/2003 | Eggleton et al. | |
| 6,837,910 B1 * | 1/2005 | Yoshikawa et al. | 48/197 FM |
| 6,928,202 B2 * | 8/2005 | Pickrell et al. | 385/12 |
| 7,151,872 B1 | 12/2006 | Xia et al. | |
| 7,336,862 B1 | 2/2008 | Xai et al. | |
| 7,379,643 B2 | 5/2008 | Mihailov et al. | |
| 7,489,835 B1 | 2/2009 | Xia et al. | |
| 7,492,980 B2 * | 2/2009 | McCarthy et al. | 385/12 |
| 7,574,075 B2 * | 8/2009 | Xia | 385/12 |
| 7,720,321 B2 * | 5/2010 | Vartuli et al. | 385/12 |

(Continued)

FOREIGN PATENT DOCUMENTS

EP    017659 A1    1/2009

OTHER PUBLICATIONS

PCT International Search Report dated Jun. 24, 2010 and Written Opinion.

(Continued)

*Primary Examiner* — Rhonda Peace
(74) *Attorney, Agent, or Firm* — Paul J. DiConza (57) ABSTRACT

A fiber sensor package is disclosed. The fiber sensor package includes an interconnection between a first optical fiber and a second optical fiber within a tubing such that the first and second optical fibers are at least partially disposed within that tubing. A bonding material is disposed across an edge of the interconnection around at least a part of the circumferential surfaces of the first and second fibers, holds rigid the interconnection of the first and second optical fibers. The methods of preparing the package, and the examples of systems benefiting from the fiber sensor package of this invention are also described.

20 Claims, 9 Drawing Sheets

U.S. PATENT DOCUMENTS

| | | | |
|---|---|---|---|
| 2002/0147394 A1* | 10/2002 | Ellingsen | 600/410 |
| 2002/0172446 A1* | 11/2002 | Fernald et al. | 385/12 |
| 2004/0264901 A1 | 12/2004 | Tao et al. | |
| 2005/0232541 A1 | 10/2005 | Mihailov et al. | |
| 2006/0146909 A1 | 7/2006 | Morse et al. | |
| 2006/0215959 A1* | 9/2006 | McCarthy et al. | 385/37 |
| 2008/0089636 A1* | 4/2008 | MacDougall et al. | 385/12 |
| 2009/0074348 A1* | 3/2009 | Xia et al. | 385/12 |
| 2009/0169150 A1* | 7/2009 | Xia | 385/12 |
| 2009/0252451 A1* | 10/2009 | Lagakos et al. | 385/13 |
| 2010/0247027 A1* | 9/2010 | Xia et al. | 385/12 |

OTHER PUBLICATIONS

Zhan et al., "High Temperature Sensing Using Higher-Order-Mode Rejected Sapphire-Crystal Fiber Gratings", Proc. of SPIE, vol. 6698, pp. 1-8, XP007912385, Sep. 17, 2007.

Nam et al., "Fabricating in Fiber Gratings in Single Crystal Sapphire Fiber", Proc. of SPIE, vol. 5350, pp. 58-65, XP002332584, Jan. 26, 2004.

S.B. Desu, R.O. Claus, R. Raheem, K.A. Murphy; High Temperature Sapphire Optical Sensor Fiber Coatings; SPIE vol. 1307 Electro-Optical Materials for Switches, Coatings, Sensor Optics, and Detectors (1990); pp. 2-9.

R.R. Dils; High-temperature optical fiber thermometer; J. Appl. Phys., vol. 54, No. 3, Mar. 1983; pp. 1198-1201.

Nubling, Rick K.; Kozodoy, Rebecca L.; Harrington, James A.; Optical properties of clad and unclad sapphire fiber; Proc. SPIE vol. 2131, 2 Pages; Biomedical Fiber Optic Instrumentation; Jul. 1994.

Adam E. Barnes, Russell G. May, Sridhar Gollapudi, Richard O. Claus; Sapphire fibers: optical attenuation and splicing techniques; Oct. 20, 1995 @ vol. 34, No. 30 @ Applied Optics; pp. 6855-6858.

Russell G. May, Tony Peng, Tom Flynn; New Optical Sensor Suite for Ultrahigh Temperature Fossil Fuel Applications; New Optical Sensor Suite for Ultrahigh Temperature Fossil Fuel Applications Semiannual Technical Progress Report; pp. 1-28, Apr. 2004.

Dan Grobnic, Stephen J. Mihailov, Christopher W. Smelser, Huimin Ding; Sapphire Fiber Bragg Grating Sensor Made Using Femtosecond Laser Radiation for Ultrahigh Temperature Applications; IEEE Photonics Technology Letters 1; Jun. 7, 2004; pp. 1-3.

Sung-Hyun Nam, Jesus Chavez, Shizhuo Yin; Fabricating in fiber gratings in single crystal sapphire fiber; Optical Components and Materials, edited by Michel J. F. Digonnet, Shibin Jiang, Proceedings of SPIE vol. 5350 (SPIE, Bellingham, WA, 2004); pp. 58-65.

Stephen C. Bates, Robert S. F. Chang; High-Temperature Fiber Optic Imaging; URL: http://www.tvu.com/HTFOImagweb.htm; pp. 1-14, 1997.

Chun Zhan, Yong Zhu, Shizhuo Yin, Paul Ruffin; Multi-parameter harsh environment sensing using asymmetric Bragg gratings inscribed by IR femtosecond irradiation; Optical Fiber Technology 13 (2007) 98-107.

Robert R. Romanosky, Susan M. Maley, Kung-Li Deng; Distributed Fiber Optic Gas Sensing for Harsh Environments; Project Facts, US Department of Energy, Office of Fossil Energy, National Energy Technology Laboratory, Advanced Research; Aug. 2007; 2 Pages.

C. Zhan, J. H. Kim, S. Yin, P. Ruffin, C. Luo; High Temperature Sensing Using Higher-Order-Mode Rejected Sapphire Fiber Gratings; ISSN 1060-992X, Optical Memory and Neural Networks (Information Optics), 2007, vol. 16, No. 4, pp. 204-210.

Kristie L. Cooper, Anbo Wang; Grant No. DE-FG26-05NT42532 Jul. 20, 2005-Jul. 19, 2008; 2 Pages.

* cited by examiner

PACKAGED SENSORS AND HARSH ENVIRONMENT SYSTEMS WITH PACKAGED SENSORS

CROSS REFERENCE TO RELATED APPLICATIONS

This application is related to co-pending U.S. patent application Ser. No. 12/413,648, entitled "Optical Sensors, Systems, and Methods of Making" filed contemporaneously herewith, which application is hereby incorporated by reference.

BACKGROUND

The invention relates generally to optical fiber sensing systems and methods, and more particularly relates to optical fiber sensing systems and methods for harsh environments.

Steady and transient temperature measurements are required in various industrial applications, including extremely harsh environments such as turbine engines, combustion cells, and power plants. Non-limiting examples of harsh environments include coal gasifiers and radiant syngas cooler vessels where the transient temperature typically ranges from 1000° F. to 3000° F. (537.7° C. to 1648.8° C.), with a pressure greater than 500 psi (3.45 MPa). Conventional sensors, such as thermocouples and pyrometers, are often difficult to use in such harsh environments due to package, penetration, and factors that may be present in these environments, such as, but not limited to, high temperatures, high pressures, presence of highly corrosive agents ($H_2S$, $SO_2$, $H_2O$), and electromagnetic interference.

A fiber Bragg Grating (FBG) is a high quality reflector constructed in an optical fiber that reflects particular wavelengths of light and transmits other wavelengths. This is generally achieved by adding a periodic or quasiperiodic variation to a refractive index of the fiber core. The fibers could be sapphire, quartz or silica fiber materials. Sapphire fiber sensors typically have superior thermal survivability due to a melting point as high as ~3700° F. (2037.7° C.), while tetrahedral fiber sensors typically survive up to ~2100° F. (1148.8° C.). FBGs, either sapphire fiber-based Bragg grating sensor or tetrahedral fiber Bragg grating sensors, are highly desirable for multi-point temperature profile measurements due to their advantages in low mass, low specific heat, multiplexing, multi-point distribution, and electromagnetic interference immunity. Specifically, the multiplexing capability of these wavelength-encoded fiber sensors enables multi-point distributed sensing for thermal profile mapping with one fiber sensing cable, in which a plurality of Bragg grating elements are cascaded with a spatial resolution from a few millimeters to centimeters, and with wavelength resolution from 1 nanometer to a few nanometers.

However, the operation within a gasifier environment, characterized by high temperature, pressure, turbulence, and corrosion, not only can affect performance of the fiber sensors but also may shorten their service lifetime. Due to small diameters of 0.125 to 0.25 mm for typical fiber materials, high temperature FBG sensors have to be packaged before they are installed or embedded into a harsh environment structure. Potentially, the packaging of the sensor could protect the sensor from damage due to the hazardous environment and raise the survival rate of the sensor during the installation and service life. For packaged high temperature FBG sensors, durability and life span of the high temperature FBG sensors are not only dependent on the sensor itself but also on the packaging materials, packaging methods, and field installation.

Further, fiber cables are used to carry data from the sensors to the data acquisition and analysis instrumentation. In harsh environments, such instrumentation is typically positioned quite far away from the measurement environment. Transmission loss, either in the fiber sensors or the fiber cables, can result in the acquisition instrumentation receiving low quality sensor data, leading to inaccurate measurements. In currently known fibers, claddings are typically used to reduce transmission loss. But cladding materials typically delaminate at high temperatures because of differences in coefficient of thermal expansion (CTE) of the cladding materials with the fiber core.

Therefore, there is a need for providing a low-loss, field deployable, packaged fiber sensing cable and sensing system, for harsh environment applications.

BRIEF DESCRIPTION

One embodiment of the present invention is a fiber sensor package. The fiber sensor package comprises a first optical fiber and a second optical fiber at least partially disposed within a tubing, forming an interconnection within the tubing, and a bonding material disposed across an edge of the interconnection around at least a part of the circumferential surfaces of the first and second fibers.

Another embodiment of the present invention is a method of forming a sensing cable package. The method comprises contacting a first optical fiber and a second optical fiber to form an optical interlink and providing a tubing with an aperture to surround it and at least a length of the first and second fibers; introducing a bonding material through the aperture to span across at least part of the circumferential surfaces of the first and second fibers around the optical interlink; and setting the bonding material to form a rigid interconnection.

One more embodiment of the present invention is a gasification system. The gasification system comprises a gasifier unit and a radiant syngas cooler and a sensor cable package at least in part disposed within the gasification system. The sensor cable package comprises a sapphire optical fiber, a silica optical fiber, and an abutting portion between the sapphire optical fiber and the silica optical fiber. The sapphire optical fiber comprises a core having an index of refraction $n_1$, and at least one Bragg grating structure; and a nanoporous cladding comprising nanopores filled with a medium along a circumferential surface of the fiber. The sapphire and silica optical fibers form interconnection and are at least partially disposed within a metal or ceramic based tubing. A bonding material is disposed spanning across an edge of the abutting portions around at least a part of the circumferential surfaces of the first and second fibers. The tubing surrounding the interconnection is hermetically sealed and the at least one Bragg grating structure is disposed within the fiber sensing cable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include fiber sensors with reduced transmission loss and methods of making, and packaged fiber sensing cable systems for harsh environment applications.

In the following specification and the claims that follow, the singular forms "a", "an" and "the" include plural referents unless the context clearly dictates otherwise.

Figure 1:
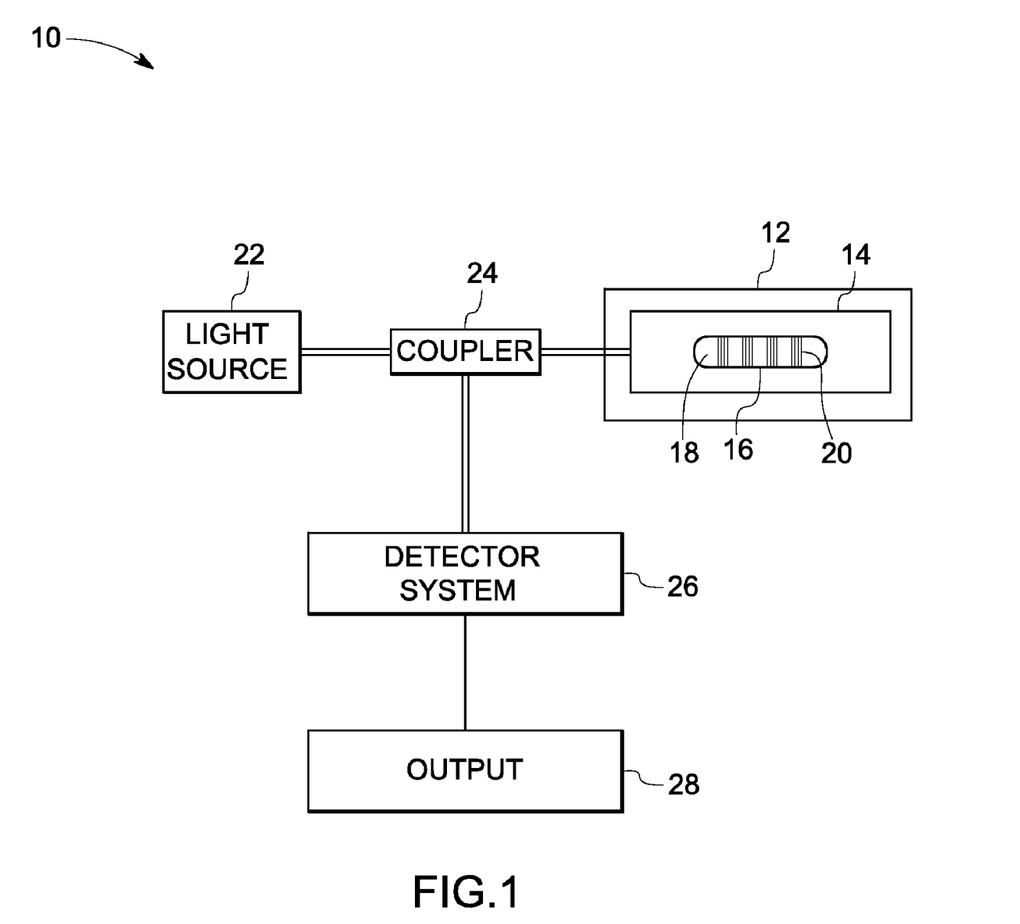
FIG. 1 is a diagrammatical representation of an optical fiber sensing system for detecting multiple parameters of an environment and/or element, in accordance with an embodiment of the present invention.

Referring now to the drawings, FIG. 1 illustrates an exemplary optical fiber sensing system 10 for detecting parameters of an environment or object 12. Although the present discussion focuses on sensing devices and systems, the present technique is not limited to the temperature sensing from gasifier and coal gasification, but is also applicable to other modalities, such as strain, and to dynamic sensing from gas turbines, combustors, and aircraft engines, among others. Accordingly, the appended claims should not be limited to or by the exemplary embodiments of the following discussion. The optical fiber sensing system 10 includes an optical fiber sensing device 14 that, in turn, includes an optical fiber sensing cable 16. As illustrated, cable 16 is disposed within the element 12, causing changes in the element 12 to translate to the optical fiber sensing cable 16. The cable 16 includes a core 18 that has a Bragg grating structure 20.

Further, the optical fiber sensing system 10 includes a light source 22 that is configured to illuminate the core of the optical fiber sensing cable 16. This illumination facilitates the generation of reflected signals corresponding to a grating period of the optical fiber sensing cable 16. The system 10 also includes an optical coupler 24 to manage incoming light from the light source 22 as well as the reflected signals from the optical fiber sensing cable 16. The optical coupler 24 directs the appropriate reflected signals to a detector system 26. Although the illustrated embodiment describes a reflection mode configuration of the sensor system, one skilled in the art would appreciate that the sensing system can also be operated in the transmission mode.

The detector system 26 receives the reflected optical signals from the optical fiber sensing cable 16 and, in cooperation with various hardware and software components, analyzes the embedded information within the optical signals. For example, the detector system 26 is configured to estimate a condition or a parameter of the object 12 based upon a diffraction peak generated from the plurality of grating elements of the optical fiber sensing cable 16 of the optical fiber sensing device 14. In certain embodiments, the detector system 26 employs an optical spectral analyzer to analyze signals from the optical fiber sensing device 14. Depending on a desired application, the detector system 26 may be configured to measure various parameters in the environment 12. Examples of such parameters include temperatures, the presence of gases, strains and pressures, among others. The information developed by the detector system 26 may be communicated to an output 28 such as, a display or a wireless communication device, or a remote station for analysis of the information. In one embodiment of the present invention, the optical fiber sensing cable 16 of the system 10 of FIG. 1 is a sensing fiber cable with at least a part of the circumferential surface or sub-surface with a modified index of refraction. As used herein and through out the rest of the specification, the terms "surface" and "sub-surface" are used interchangeably and are used to refer to a thin portion or volume of the fiber cable at or near the circumferential surface. While the word circumferential is utilized, this does not denote a particular geometry of the fiber, in fact many different geometries are envisioned.

Figure 2:
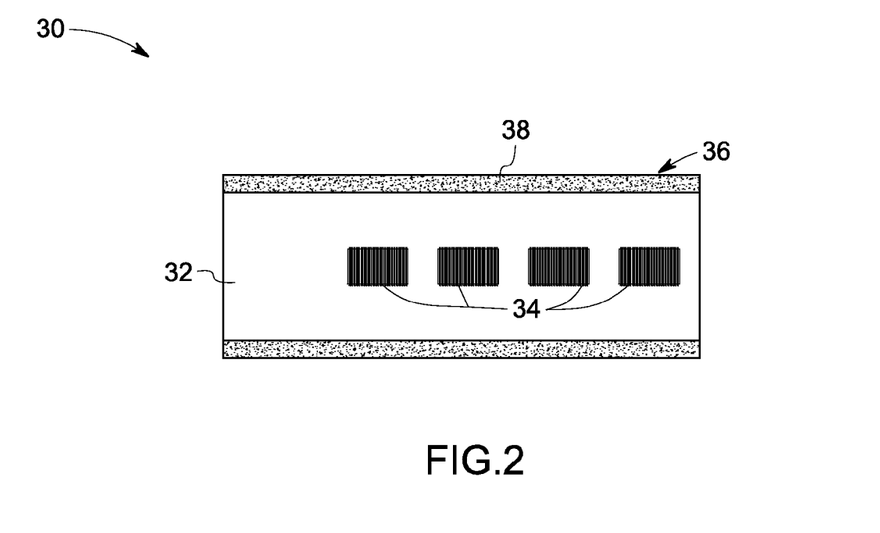
FIG. 2 is a diagrammatical representation of an optical fiber sensing cable with a fiber having a core and a circumferential surface with a nanoporous cladding, in accordance with an embodiment of the present invention.

FIG. 2 illustrates one such exemplary optical fiber sensing cable 30 including a core 32 with an index of refraction $n_1$ that has an array of Bragg grating structures 34 and a circumferential surface 36. The circumferential surface 36 of the optical fiber sensing cable is provided with nanopores 38 to form a nanoporous cladding with an index of refraction $n_2$ different from the index of refraction $n_1$ of the core 32. The nanopores 38 present in the sub-surface help to alter the index of refraction of the circumferential surface 36. In one embodiment, the index of refraction $n_2$ of the circumferential surface 36, having nanoporous cladding, is lower than the index of refraction $n_1$ of the fiber core 32. In another embodiment, the index of refraction $n_1$ has a value in a range from about 1.75 to about 1.78 and the index of refraction $n_2$ has a value of $n_1$-$\delta$, wherein $\delta$ is in a range from about $10^{-2}$ to about $10^{-4}$. This lower index of refraction $n_2$ aids in internal reflection of the light in the fiber core 32 and in turn reduces the transmission loss of the fiber. In one embodiment, the nanopores 38 of the nanoporous cladding are constructed as open pores. In some embodiments, the nanopores 38 are at least in part open pores. In various embodiments, the nanopores 38 are at least partially filled by a medium primarily for optical properties modification. In a further embodiment, the nanopores 38 are at least in part filled with air. In other embodiments, nanopores 38 are at least in part filled with quartz material based nanoparticles. In one embodiment, a thin layer or membrane surrounds the nanoporous cladding. In an exemplary embodiment an alumina based membrane is disposed over the nanoporous cladding. It is expected that disposing alumina based membrane over the nanoporous cladding on the circumferential surface of the sapphire fiber will help accommodate any temperature induced differences between the sapphire fiber core and the membrane layer.

In one embodiment of the invention, the material of the optical sensor cable, and specifically the core of the cable, is a sapphire fiber material. Sapphire, being a high temperature melting point material (~3700° F.), has many advantages over comparatively lower melting point materials, especially for high temperature applications. For example, while the commonly used silica-based FBG sensors can be used effectively at some temperature ranges, they exhibit undesirable thermal instability at elevated temperatures such as temperatures greater than 1800° F. (982.2° C.). This is because when the temperature is greater than 1200° F. (648° C.), the fiber material experiences a microstructural morphology transformation from amorphous glass network to a microcrystalline structure. Such a structural transition will greatly modify a Bragg grating (refractive index modulated structure) present in the fiber. Since sapphire materials are crystalline in structure and do not have any structural phase transition up to melting point, it potentially enables fiber sensing performance at higher temperatures without material structural change.

Therefore, sapphire fiber materials with their high melting point and crystalline structure make sapphire fibers operate reliably in harsh environments for extremely high temperature sensing. Thus, sapphire-based fiber Bragg grating-based sensors are suited for high-temperature sensing with a thermal dynamic range from about 1800° F. (982.2° C.) to about 3000° F. (1648° C.) and potentially capable of surviving both high-temperature and high-pressure conditions. Some of the typical sapphire fiber material properties (such as for a sapphire fiber from Photran LLC) are listed below in Table 1.

TABLE 1

| Sapphire fiber material properties | |
|---|---|
| Fiber core diameter (microns) | 150, 250, 325, 425 |
| Numerical Aperture | 0.12 |
| Transmission per meter | 80% |
| Bending radium (mm) | 20, 30, 60, 80 |
| Length (m) | 2 |
| Maximum length (m) | 4 |

Figure 3:
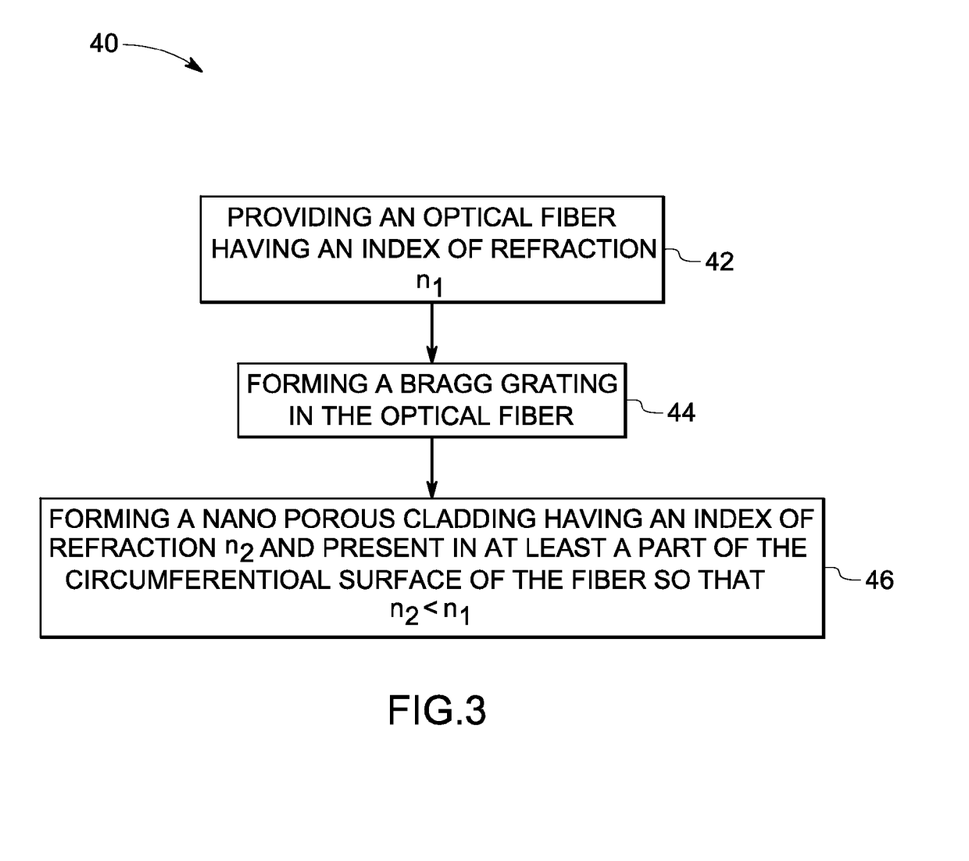
FIG. 3 is a schematic representation of a method of providing an optical fiber with a core and forming a nanoporous cladding pores in at least a part of a circumferential surface according to an embodiment disclosed herein.

FIG. 3 schematically represents a method 40 of providing an optical fiber with a core 32 (FIG. 2) and forming a nanoporous cladding composed of nanopores 38 (FIG. 2). An optical fiber having an index of refraction $n_1$ is provided in step 42 (FIG. 3), and a Bragg grating, configured to reflect a wavelength of light in phase, is formed in step 44 on the optical fiber core 32 (FIG. 2). In step 46 (FIG. 3), nanopores 38 (FIG. 2) are formed on at least a part of the circumferential surface 36 to create a nanoporous cladding surrounding the core and having an index of refraction $n_2$ with $n_2 < n_1$. In alternate embodiments, the Bragg grating may be formed subsequent to the formation of the nanoporous cladding.

The nanopores, in some embodiments, may be formed in step 46 (FIG. 3) on the circumferential surface of the optical sensing fiber by various means such as by providing a porous cladding and integrating the cladding with the core, and inscribing the nanopores on the core surface. In one embodiment, the formation of the nanopores is based on a chemical etching process to form a sub-surface structure with a lower index of refraction than the core. In certain other embodiments, the nanopores are formed in step 46 (FIG. 3) by impingement of a high-energy radiation upon the circumferential surface of the optical sensing fiber. In one example, by looping optical sensing fibers with a diameter less than 10 cm, a 2-4 meter length of optical sensing fiber cladding can be concurrently formed in a high-energy radiation chamber. In one embodiment, the high-energy radiation used is a proton radiation. In one embodiment, the energy of the radiation used is in the range of about 0.5 MeV to about 5 MeV. In another embodiment, the energy of the radiation is in the range of about 1 MeV to about 3 MeV. In yet another embodiment the energy of the radiation used is about 2 MeV.

The depth of the formed nanoporous cladding depends on the fiber material and the energy of the incident radiation, apart from the other possible factors such as, but not limited to, the impinging distance, temperature, and surrounding environment. In one embodiment, the depth of the nanoporous cladding including the nanopores is in a range from about 1 micron to about 1.5 microns. In another embodiment, the depth of the nanoporous cladding is in a range between about 1.5 microns to about 5 microns. In still another embodiment, the depth of the nanoporous cladding is about 1.5 microns.

Figure 4:
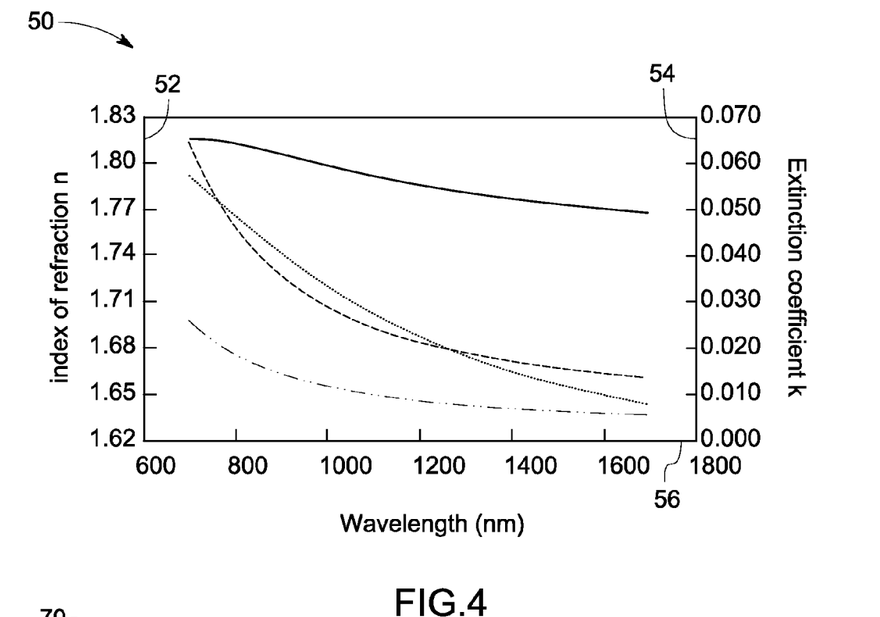
FIG. 4 is an ellipsometer-based spectroscopic study on sapphire plate for evaluating the high-energy photon radiation effect on sapphire material surface optical properties according to an embodiment disclosed herein.

FIG. 4 is a comparative plot of optical properties for sapphire material before and after sub-surface modification. For easier analysis from a radiated sample, a thin sapphire plate was used for the optical properties studies. A high-energy proton radiation of about 2 MeV was impinged on the sapphire plate. The depth of the nanoporous cladding obtained from the high-energy proton impingement is about 1.5 μm. Line plot 50 illustrates the measured variation in a real part n of the complex index of refraction (left Y axis 52) and imaginary part k of the complex index of refraction (right Y axis 54) with wavelength (X axis 56). The plot clearly shows the modification of the properties in the sapphire material after sub-surface modification. The curve fitted spectroscopic ellipsometer data shows the change in the index of refraction in the nanoporous cladding structure could be up to about 8%, despite the potential fitting error from the three-layer model (air/nanoporous cladding structure/sapphire material). The reduction of the surface layer optical refractive index is associated with the formation of the nanoporous cladding structure. The refractive index near sub-surface is effectively reduced by an average of the high-defect-density surface structure and sapphire material. This demonstrates that a sapphire fiber having a nanoporous cladding could mitigate the transmission or reflection loss for longer length fiber sensing devices. Further, as the cladding is of the same material as the underlying material, de-lamination due to differences in CTE at high temperatures is prevented. Additionally, a medium such as air or nanoparticles of quartz material may be used to fill the nanopores and help modify the index of refraction of the cladding.

A Bragg grating structure can be formed by different techniques. Non-limiting examples include a micromachining process, such as diamond saw cutting, or a chemical process, such as doping, or by the exposure to a UV laser beam etc. In one embodiment, the Bragg grating structure is inscribed by inducing a microcrystalline structure by means of a high-power femtosecond laser, followed by a post-thermal treatment process. This method constructs a periodic sequence of a crystalline grating structure and a micro-void filled crystalline grating structure.

In one example, a fiber Bragg grating structure in a sapphire fiber is inscribed using a high-power pulsed femtosecond near-infrared laser and phase mask technique. This will construct a periodic modulated grating structure formed by regions of crystalline sapphire and microvoid filled crystalline sapphire. The resonant wavelengths of a sapphire Bragg grating are determined by $$\lambda_1 \approx 2 \cdot n_a \cdot \Lambda \quad [1]$$

and $$\lambda_2 \approx 2 \cdot n_c \cdot \Lambda \quad [2]$$

where $n_a$ and $n_c$ correspond to anisotropic indices of refraction in a-b plan and c-axis of the sapphire fiber, and $\Lambda$ is the periodicity of the grating modulation. The small difference between the two indices of refraction will induce Bragg resonant peak either with a broad profile or with discrete multi-peak profile. In some conditions, such double reflected waves could interfere with each other to superpose a slow varying interference background.

Figure 5:
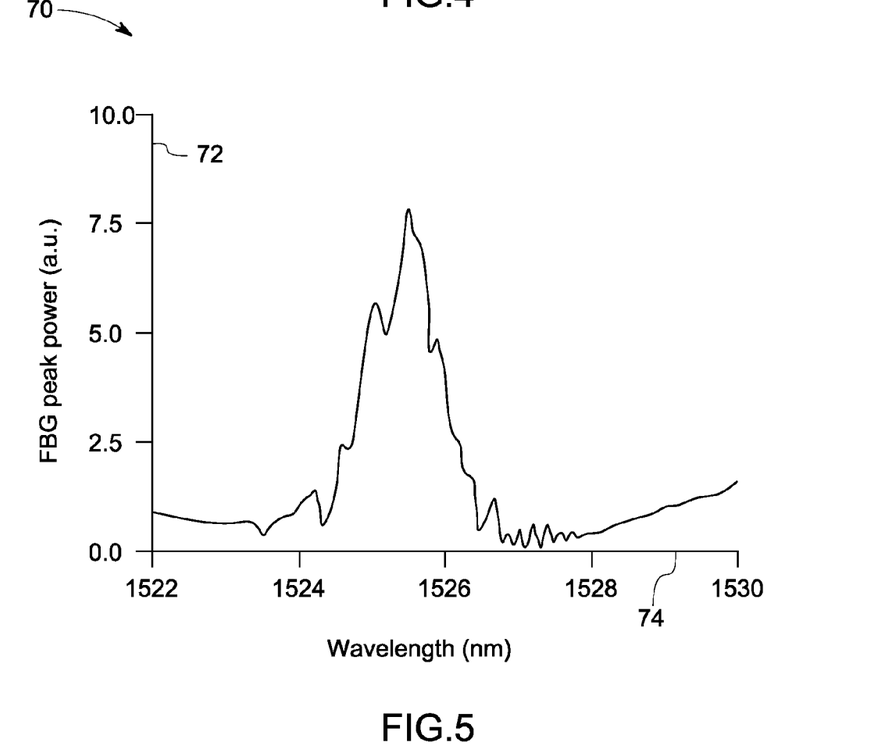
FIG. 5 is a graphical representation of a sapphire fiber Bragg grating resonant wavelength spectrum measured at a temperature T=2426° F. (1330° C.) according to an embodiment disclosed herein.
Figure 6:
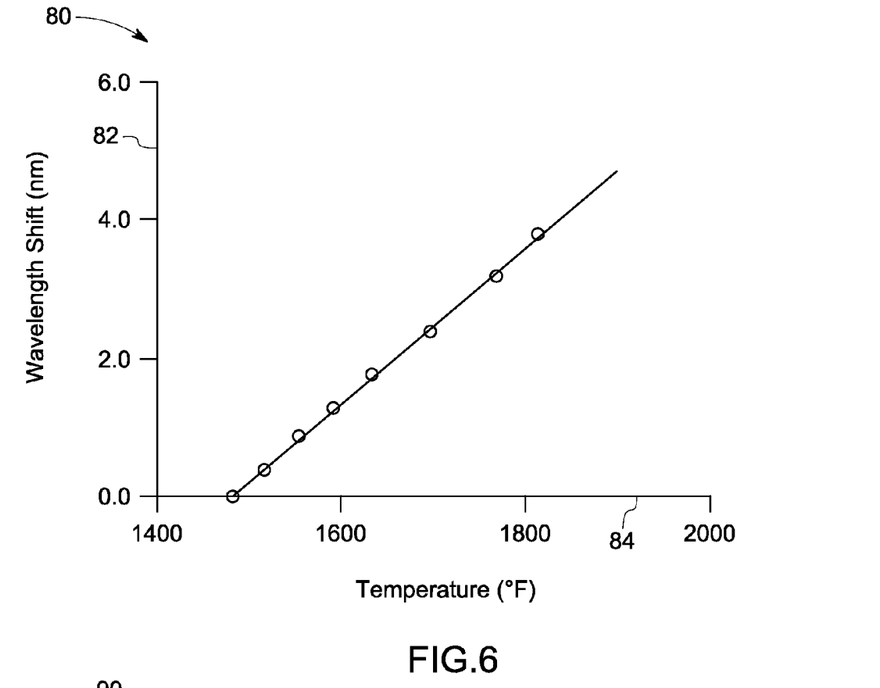
FIG. 6 is a graphical representation of a linear wavelength variation with temperature of a sapphire fiber Bragg grating sensor for T<1800° F. (982.2° C.) according to an embodiment disclosed herein.
Figure 7:
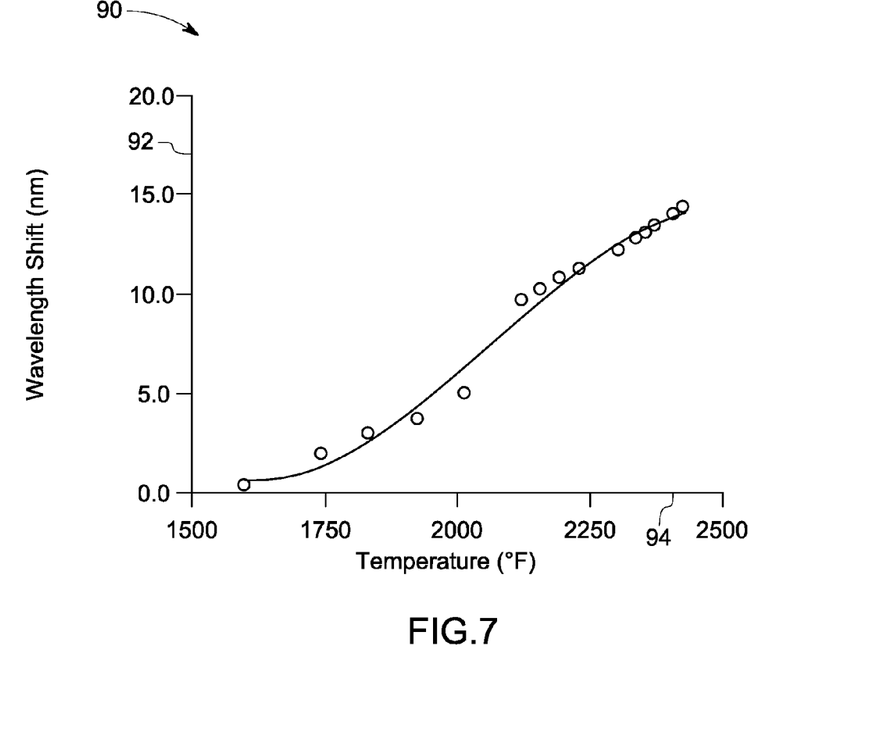
FIG. 7 is a graphical representation of a nonlinear wavelength variation with temperature of a sapphire fiber Bragg grating sensor for T>1600° F. (871.1° C.) according to an embodiment disclosed herein.

FIG. 5 is a graphical representation 70 of variation of peak power (Y axis 72) with respect to the wavelength (X axis 74) for a sapphire fiber Bragg grating structure, illustrating a spectrum with a relatively broad peak profile. FIGS. 6 and 7 illustrate a feasibility study probing the responsivity of a sapphire fiber Bragg grating structure at different temperatures and at a temperature over a period of time. The length of the sapphire fiber sensors from 300 mm to 2000 mm with the grating position 50 mm far from the distal end. Plot 80 of FIG. 6 shows that the Bragg grating resonant wavelength shift 82 with respect to temperature 84 for temperatures lower than 1800° F. (982.2° C.) and plot 90 of FIG. 7 shows the Bragg grating resonant wavelength shift 92 with respect to temperature 94 for temperatures greater than 1600° F. (871.1° C.). The feasibility study has found that when temperature is lower than 1800° F. (982.2° C.), fiber sensor's response to temperature can be described linearly with a slope of 11.2 pm/° F. However, such a relationship becomes nonlinear for more elevated temperature range as can be seen from the non-linear fit to data of plot 90 of FIG. 7. The transfer function of the wavelength shift with temperature at temperatures greater than about 1600° F. (871.1° C.) can be described by $$\Delta\lambda(nm) = 306.894 - 0.483 \cdot \Delta T + 2.4575 \cdot \Delta T^2 - 3.877 \times 10^{-8} \Delta T^3 \quad [3]$$

Figure 8:
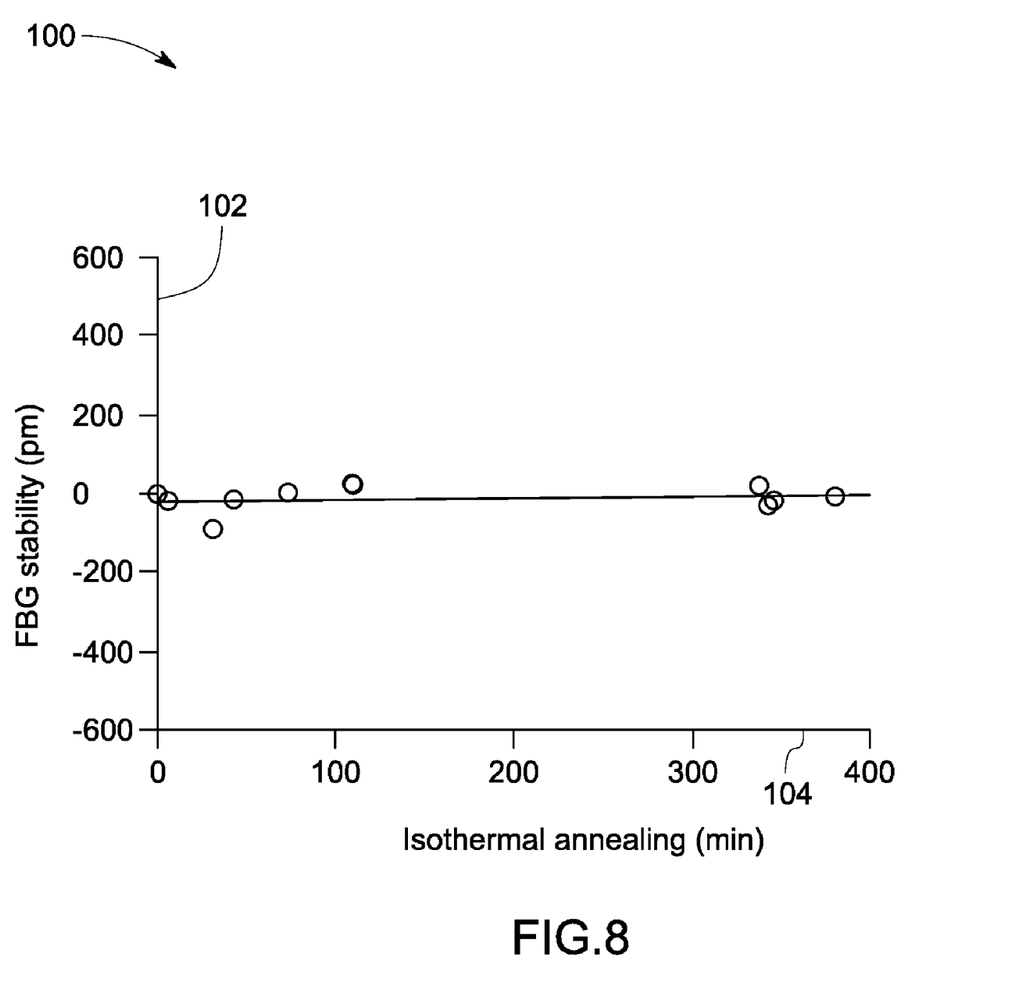
FIG. 8 is a graphical representation of a wavelength stability with time of a sapphire fiber Bragg grating sensor measured at isothermal annealing condition of 1950° F. (1065.5° C.) according to an embodiment disclosed herein.

FIG. 8 further shows the thermal stability plot 100 of a sapphire fiber sensor by measuring the Bragg resonant wavelength shift 102 with respect to the isothermal annealing 104 at 1950° F. (1065.5° C.) for about 6.5 hours. The plot 100 of FIG. 8 clearly illustrates that the sapphire fiber Bragg grating embodiments of the present invention are thermally stable over time.

Embodiments of the present invention include both single mode and multimode sensor systems. These sensor systems may be operably configured to sense at least one of a change in temperature, pressure, stress, strain or combinations thereof. In some embodiments, the sensor cable of the sensor systems may be packaged for operation in harsh environments. In a non-limiting example, the sensor cable may be hermetically packaged within a platinum-rhenium based enclosure.

Figure 9:
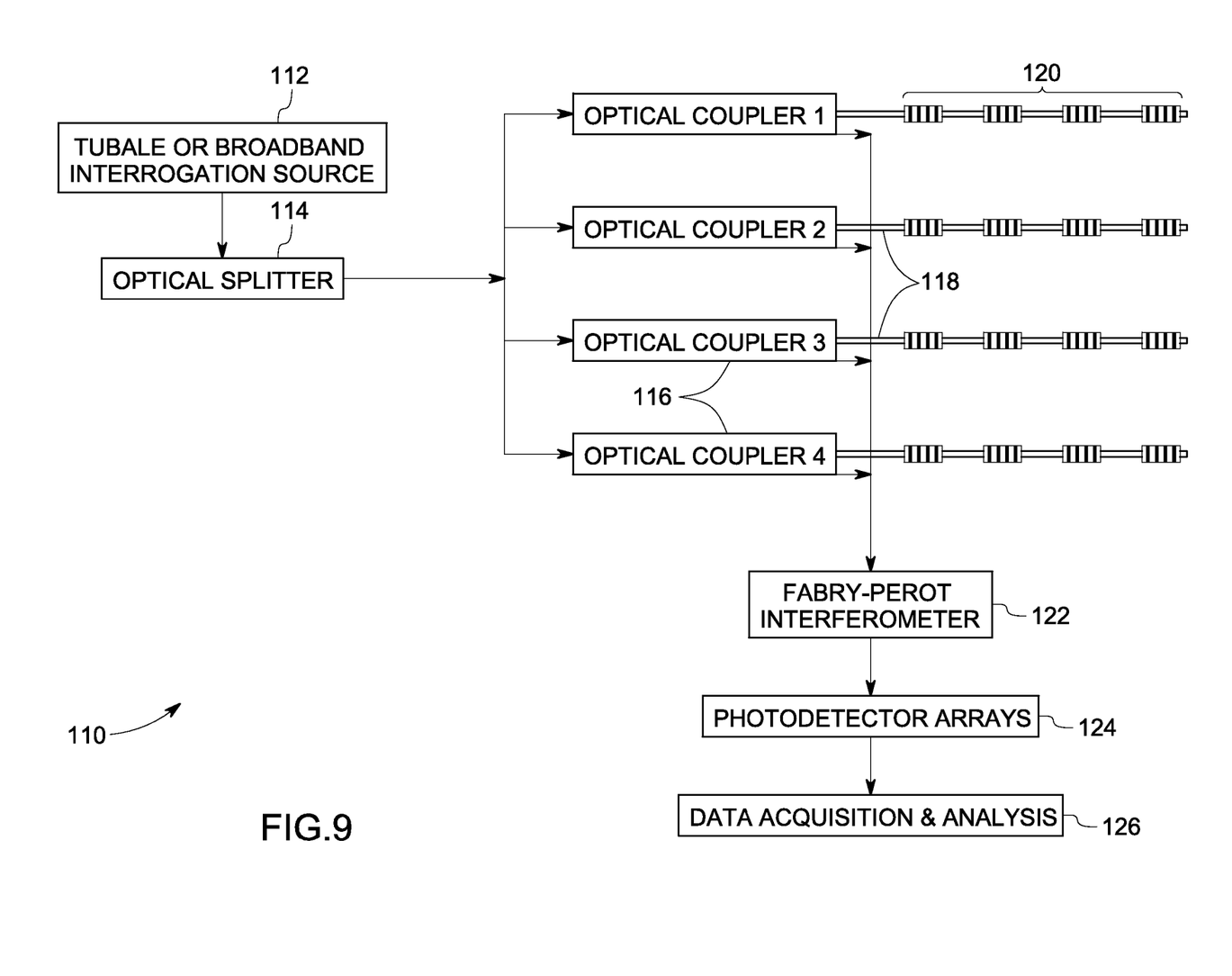
FIG. 9 is a diagrammatical representation of a multimode optical fiber sensing system for detecting multiple parameters of an environment and/or element, in accordance with an embodiment of the present invention.

In one embodiment, a multimode temperature sensor system 110 includes a broadband or tunable interrogation source 112 as illustrated in FIG. 9. Such a system can interrogate a multi-mode fiber sensor signal with a high signal-to-noise ratio and also provide multi-point sensing instrumentation with potential for temperature, strain and vibration simultaneous detection. The interrogation source 112 generates a multimode interrogation signal for multimode-based fiber sensor wavelength-division-multiplexing based temperature measurement. The interrogation signal is split using a splitter 114 and carried via multimode fibers to optical couplers 116 that couple the interrogation signal into fiber sensing cables 118 including the FBGs 120. Upon interrogation of the fiber sensing cable by the interrogation signal, the Bragg grating structures 120 generate response data signal characteristic(s) of a sensed parameter such as temperature, which sensed parameter is then filtered through one or more Fabry-Perot interferometers 122 and is incident on a photodetector array 124 and the response data signal is then acquired by a data acquisition and analysis system 126 to estimate the sensed signal.

Due to large diameter of a sapphire fiber cable, the propagation modes in a multimode fiber are determined by $$V = 2\pi \cdot a / \lambda \cdot \sqrt{n_2^2 - n_1^2} \quad [4]$$

in which $\lambda$ stands for the wavelength of light, 2a stands for the core diameter of the fiber core, and $n_1$ and $n_2$ respectively stand for indices of refraction of the fiber core and the cladding. The total mode number is given by $V^2/2$. In order to reduce the transmission or reflection loss, the multimode fiber connectors and optical couplers/splitters and other parts should have matched V-numbers. In a non-limiting example, the diameter of all optical devices used in the sensor system is about 140 μm with FC/FC (Fiber-optic Cable) connection and the designed spectral range is about 80 nm spectral range and ~30 dB dynamic range.

In one embodiment, the sapphire FBG is disposed inside a high temperature packaging. The package material and package design helps in minimizing the disadvantages associated with high-temperature induced low-tensile and low-flexural strengths and thereby presenting a practical calibration method for correlating Bragg resonant wavelength shift with temperature.

Figure 10:
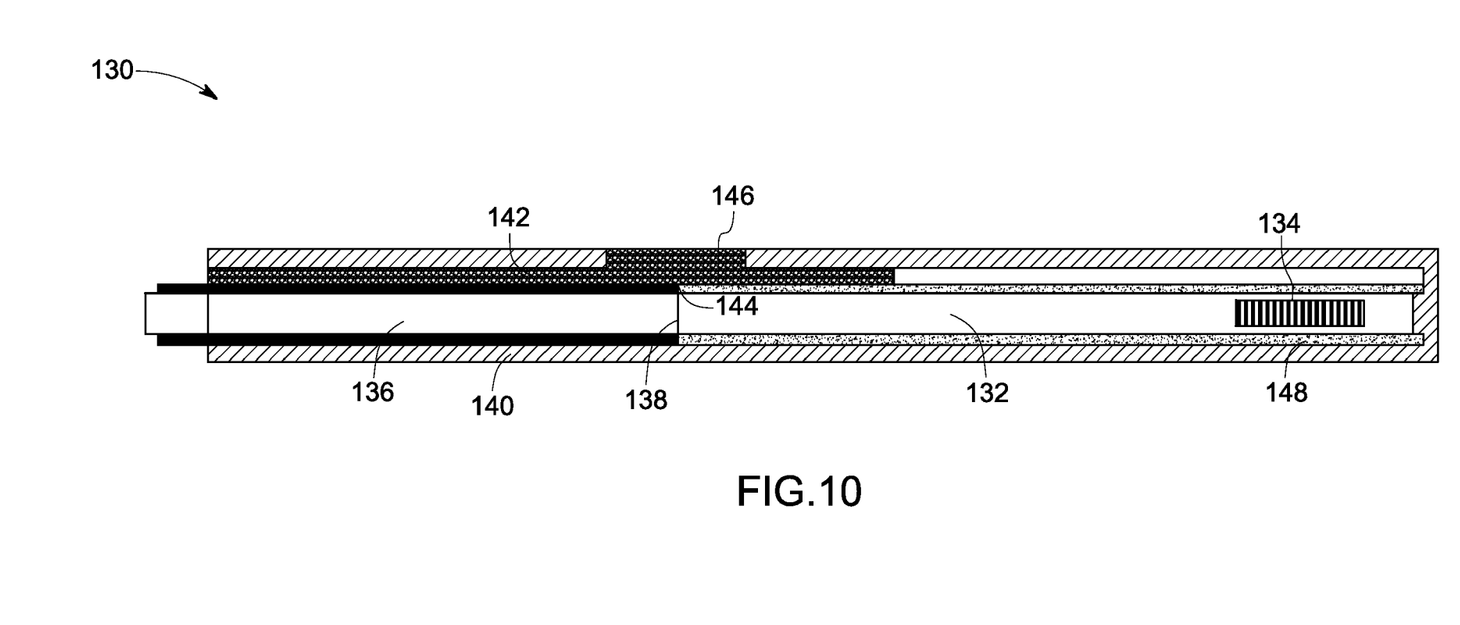
FIG. 10 is a schematic representation of a fiber sensor package with a tubing and a bonding material holding in place the interconnection of the two fibers according to another embodiment disclosed herein.

One embodiment of the invention is a fiber sensor package 130 as illustrated in FIG. 10. The fiber sensor package 130 includes a first optical fiber 132 including a FBG 134, a second optical fiber 136 and an interconnection 138 between the first optical fiber and second optical fiber. As used herein and throughout the specification, the terms "interconnection" and "optical interlink" are used interchangeably and are used to refer to abutting portions of the first and second optical fibers, operably positioned to enable transfer of optical signals between the fibers. The first optical fiber is for sensing and the second optical fiber is typically for signal transmission and reflection. The first optical fiber 132, and the second optical fiber 136 are at least partially disposed within a tubing 140 with the interconnection 138 being wholly present within the tubing. A bonding material 142 is disposed spanning across an edge 144 of the interconnection 138 around at least a part of the outer, typically circumferential, surfaces of the first and second optical fibers. In one embodiment, the fiber sensor cable package is operable in harsh environments, for example in the atmospheres such as a coal gasifier and radiant syngas cooler, for radial temperature profile mapping at temperatures greater than 1800° F. (982.2° C.).

The bonding material 142 used herein is capable of bonding in place the first fiber 132 and the second fiber 136 in contact with each other. The bonding material 142, in some embodiments, is a high temperature material. The bonding strength of the bonding material does not degrade at the temperature of operation of the sensing cable. In some embodiments, the bonding material 142 of the fiber sensor package is not present in-between the first and second fibers at the interconnection 138, but present at least partially around the circumferential surfaces of the first fiber 132 and the second fiber 136 at the interconnection and in the vicinity of the interconnection. Therefore, any loss of signal at the optical interlink due to the bonding material being present between the first fiber 132 and the second fiber 136, due to reflection at the optical interlink, is avoided. In one embodiment, the bonding material 142 is a ceramic material and in another embodiment the bonding material 142 is a mixture of a ceramic material and a metallic powder material. In yet another embodiment, the bonding material 142 is a ceramic metal composite. When the bonding material 142 is a mixture of ceramic and metallic materials, in one embodiment, the metallic material is introduced into mixture in the form of a putty. In non-limiting examples, the bonding material has properties as shown in Table 2.

TABLE 2

Bonding material properties

| | Metallic Adhesive Materials | | |
|---|---|---|---|
| | A | B | C |
| Maximum Operation Temperature (° F.) | 1200 | 2000 | 2000 |
| Base | Al | Ni | Stainless steel |
| CTE ($10^{-6}$/F.) | 10 | 4 | 10 |
| Bond Strength @ 200° F. (psi) | 500 | 400 | 600 |
| Bond Strength @ 1200° F. (psi) | 1000 | 1200 | 1400 |
| Cure @ RT (hrs) | 24 | 24 | 24 |

The bonding material 142 can be introduced into the tubing 140 of the sensor package 130 in many different ways. In one embodiment, the bonding material 142 is introduced in the form of putty through an aperture 146 in the tubing 140 and allowed to flow across the circumferential surfaces of the first and second fibers (132 and 136) and set around the interconnection 138. In a non-limiting example, the bonding material completely surrounds the interconnection. In one embodiment, the bonding material 142 is introduced into the tubing at the interconnection 138 at a temperature greater than about 1200° F. (648.8° C.) and then thermally cured to set. The thermal curing process can take place at various temperature steps such as ambient, 200° F. (93.3° C.), 400° F. (204.4° C.) to 600° F. (315.5° C.).

In one embodiment, the tubing 140 of the fiber sensor package 130 described above includes a metal. In another embodiment, the tubing 140 includes one or more noble metals. In some embodiments, the tubing 140 is made up of a high temperature alloy. A high temperature alloy is defined herein as an alloy having melting temperatures greater than 2000° F.(1093.3° C.). The typical alloy tubing materials used are, for example, Hastelloy X, Inconel, Incoloy, Molybdenum (Mo), and Tantalum (Ta). Non-limiting examples of the alloy materials suitable for the packaging material includes Platinum (Pt)/Rhodium (Rh), Pt/Rhenium (Re), Pt/Iridium (Ir), Rh/Ir, and Rh/Re. In one embodiment, the tubing 140 comprises an alloy of platinum and rhenium. In another embodiment, the tubing 140 comprises an alloy of rhenium and iridium. In some embodiments, the tubing 140 is hermetically sealed to fully enclose the first optical fiber.

In one embodiment, the internal diameter of the tubing 140 ranges from about 0.3 mm to about 1.0 mm, and wall thickness of the tubing 140 is about 0.5 mm to about 1.0 mm. In one embodiment, the tubing 140 of the fiber sensor package is filled with a gaseous medium such as air, nitrogen, argon, or the like and combinations thereof. In one embodiment, the enclosure hermetically sealing the fiber sensing cable, includes a gas filling, for example nitrogen, to maintain the integrity of the fiber sensing cable and protect against potential leakage of the syngas or other hazardous gases into the enclosure when the environment is not only at a high temperature but also at a high pressure of 400-800 psi (2.75-5.51 MPa).

In one embodiment the first optical fiber 132 is a sapphire fiber and the second optical fiber 136 is a silica fiber. In one embodiment the first fiber 132 comprises a core 134 having an index of refraction $n_1$, and a nanoporous cladding 148 having an index of refraction $n_2$ around a circumferential surface of the first fiber 132. In a further embodiment, the second fiber 136 also comprises a core, and a circumferential surface comprising nanopores of silicon dioxide as cladding (not shown).

The first and second optical fibers can be individually operated in a single mode or multimode modality. Therefore, in one embodiment, the first and second fibers are operated in single mode for single-mode sapphire sensor interrogation, in another embodiment both the first and second fibers are operated in multimode for multimode sapphire fiber Bragg grating interrogation, and in yet another embodiment either of the first and the second fiber is operated in single mode and the other fiber is operated in multimode for hybrid sapphire and silica fiber interconnection and signal interrogation.

The transmission loss between the first fiber and the second fiber can, in one embodiment, be controlled by matching the mode number or V-number, namely:

$$V(sapp) = \frac{2\pi \cdot a(sapp)}{\lambda} \cdot \sqrt{n_2^2(sapp) - n_1^2(sapp)} \quad [5]$$
$$= \frac{2\pi \cdot a(sapp)}{\lambda} \cdot NA(sapp)$$

$$V(silica) = \frac{2\pi \cdot a(slica)}{\lambda} \cdot \sqrt{n_2^2(silica) - n_1^2(slica)} \quad [6]$$
$$= \frac{2\pi \cdot a(silica)}{\lambda} \cdot NA(silica);$$

To reduce loss, when the two fibers are interconnected, the following relationship should be approximately satisfied:

$$a(silica) \cdot NA(silica) \approx a(sapp) \cdot NA(sapp); \quad [7]$$

where NA(silica) and NA(sapp) are numerical apertures of silica fiber and sapphire fiber, and a(silica) and a(sapp) are the fiber core radius, respectively.

The numerical aperture of sapphire fiber depends upon the nanoporous cladding, which also controls the transmission loss. Although Eq. (7) indicates the transmission loss control condition, it doesn't account for the loss of the evanescent field energy, which plays a role, when the thickness of the nanoporous cladding is much less than the wavelength of the propagating modes. In a non-limiting example, for a central interrogation wavelength of about 1.55 μm, to operate under the condition of equation 7, the nanoporous cladding thickness would have to be about 1-2 times the interrogation wavelength or greater.

In a non-limiting example, the first fiber 132 is a sapphire fiber disposed within a sapphire capillary including a nanoporous cladding 148 composed of nanopores, and the second fiber 136 is a silica fiber and the bonding material is made of a ceramic metal composite and the tubing 140 is formed of a noble metal alloy. Integration of the sapphire FBG sensors and high-strength CMC bonding and noble metal package design provide both high tensile and flexural mechanical strengths and survivability to the sensor cable package.

Figure 11:
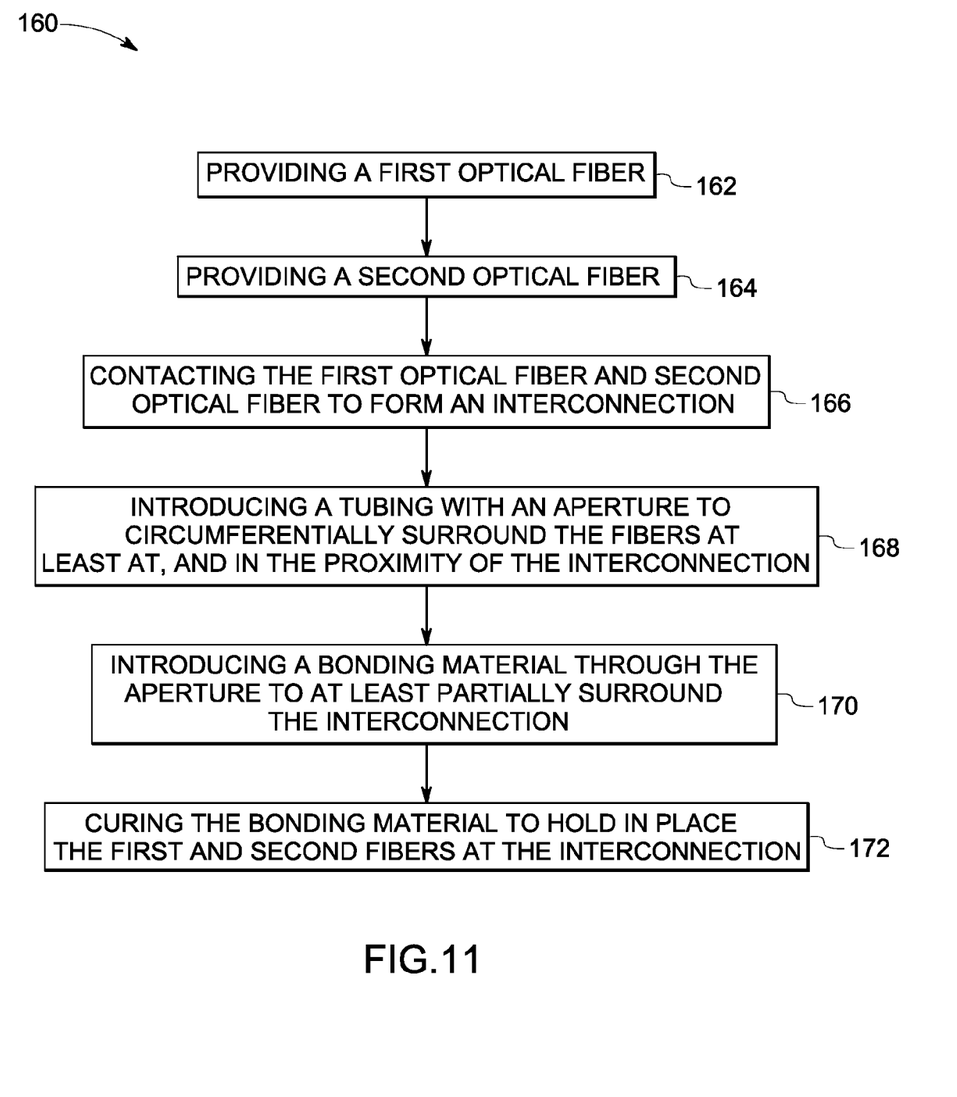
FIG. 11 is a schematic representation of a method of providing a fiber sensor package with a tubing and a bonding material holding in place the interconnection of two fibers according another embodiment disclosed herein.

FIG. 11 describes a method 160 of forming a sensing cable package. The method 160 includes the steps of providing a first fiber 162 and a second fiber 164 and contacting a first fiber and a second fiber to form an optical interlink 166, providing a tubing with an aperture 168, wherein the tubing circumferentially surrounds at least a length of the first and second fibers and the optical interlink such that the aperture is formed on the tubing at the vicinity of intersection. The method 160 further includes disposing a bonding material through the aperture to span across at least part of the circumferential surfaces of the first and second fibers around the interconnection 170; and setting the bonding material to form a rigid interconnection of the first and second fibers 172. Due to this arrangement, while undergoing thermal effects such as thermal expansion, the fibers on each side of the bonding material can freely move towards opposite directions at elevated temperatures. This provides a more reliable interconnection for the two kinds of fiber materials even with different coefficients of thermal expansion (CTE). This thermally insensitive package design with minimum sensing signal loss at the sapphire sensing fiber-silica fiber interconnection improves the long-term, reliable operation of the sensing cable in extremely harsh environments.

Figure 12:
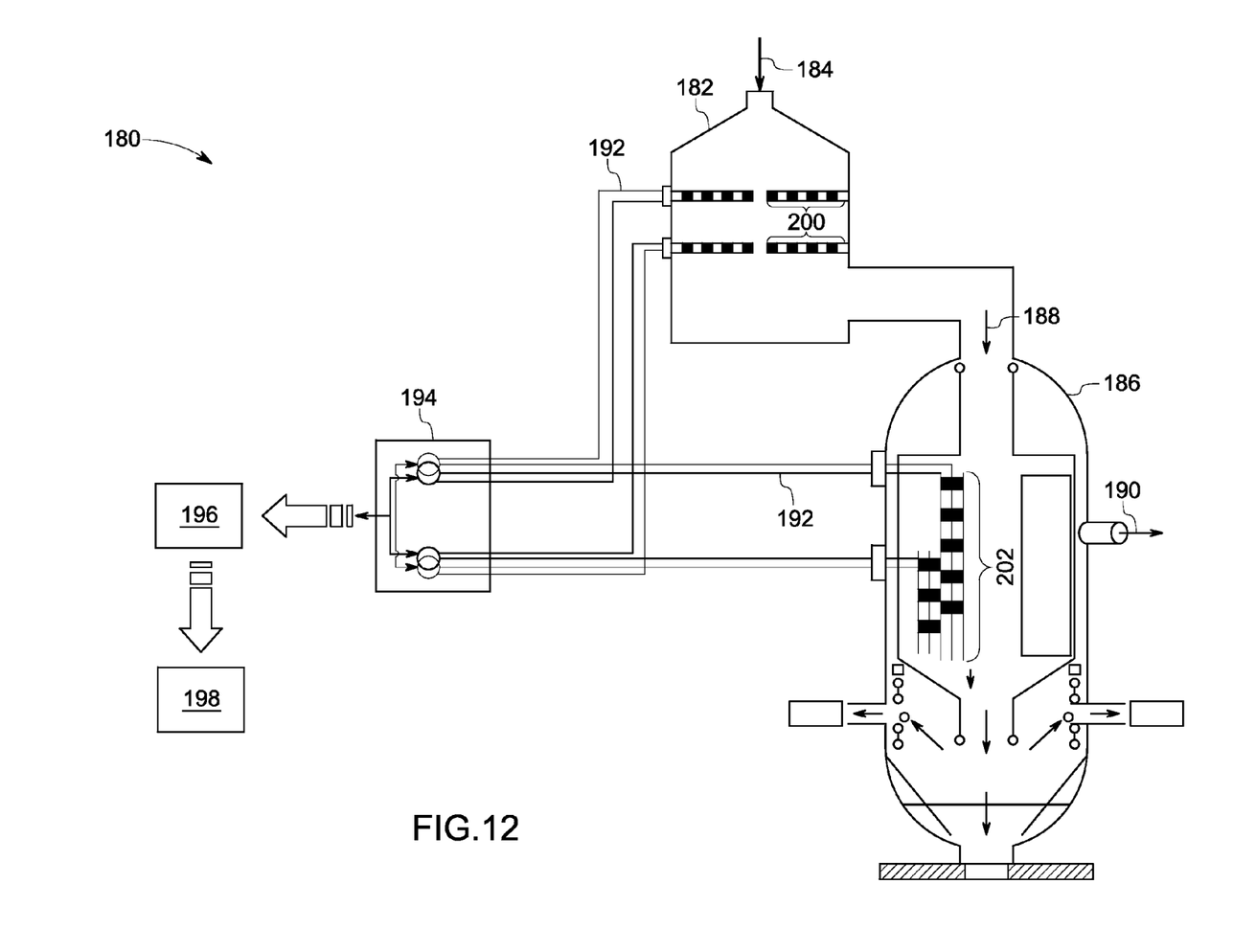
FIG. 12 is a schematic illustration of a fiber sensor cable deployed in a gasification system and a coal gasification radiant syngas cooler (RSC) vessel in another embodiment disclosed herein.

In one embodiment, a gasification system including a gasifier unit and a radiant syngas cooler (RSC) including a sensor cable package is disclosed. A gasification system is an apparatus for converting carbonaceous materials, such as coal, petroleum, petroleum coke or biomass, into carbon monoxide, hydrogen, and carbon dioxide. FIG. 12 describes a gasification system 180 including a gasifier unit 182 with a coal feed opening 184. The coal is introduced into the RSC 186 from gasifier outlet 188, and the produced syngas is delivered to external gas turbine by pipeline 190. Some of the fiber sensing cables 192 used for sensing in the RSC are installed along the platen edge of the RSC while others are hung in the gas stream of the radiant syngas cooler. The fiber sensing cables are terminated by a junction box 194. The sensing signal interrogation system 196 can be remotely located in a control room. The data is processed and analyzed with a computer 198, for example. The distributed fiber sensing system 192 with FBG sensors distributed radially 200 can be deployed in the gasifier unit 180 of the coal gasification environment and FBG sensors distributed vertically 202 can be deployed in a radiant syngas cooler (RSC) vessel.

Upon start of gasification, the temperature ramps up and reaches a gasification temperature range of about 2300° F. (~1260° C.) to about 2700° F. (1426° C.) at the top RSC entry location. The temperature is higher towards the top of the RSC and gradually decreases towards the bottom (in this particular arrangement). In one embodiment, the sensors have the same response wavelength at a given temperature. In an alternate embodiment, the sensors are configured to have varied response wavelengths induced by dynamic coal gasification processes. In a non-limiting example, the fiber sensing cable may seal several hundred fiber sensors in one or more fibers within a length of a few meters to a few kilometers in distance. In one embodiment, the fiber sensors in the cable could be used for steady thermal profile mapping, dynamic thermal profile mapping, and transient thermal ramping. The hermetically sealed fiber sensing cables can also be of multi-function capability. One example of the multi-function capability may be based simultaneous sensing of thermal and mechanical strain response characteristics. The mechanical strain sensitivity can be used for steady and dynamic pressure detection, structural stress and strain measurements, and structural vibration sensing. In one embodiment, the hermetically sealed fiber cables are not limited to high-temperature and high-pressure environment measurements; they can also be used in high-electromagnetic interference noise, high-radioactive nuclear environments, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fiber sensor package comprising:
    an interconnection between a first optical fiber and a second optical fiber disposed within a tubing comprising one or more noble metals and an aperture on the tubing at the vicinity of the interconnection, wherein the first and second optical fibers are at least partially disposed within the tubing; and
    a bonding material disposed through the aperture and within the tubing at least partially around the circumferential surfaces of the first fiber and the second fiber at the interconnection and in the vicinity of the interconnection, bonding in place the first fiber and the second fiber such that fibers on each side of the bonding material can freely move towards opposite directions as a result of thermal expansion,
    wherein the first optical fiber comprises at least one fiber Bragg grating.

2. The fiber sensor package of claim 1, wherein the bonding material is not present between the first and second fibers at the interconnection.

3. The fiber sensor package of claim 1, wherein the first optical fiber comprises a core having an index of refraction n1 and a nanoporous cladding, having an index of refraction n2, present around at least a part of the circumferential surface of the fiber.

4. The fiber sensor package of claim 1, wherein a signal transmission loss across the interconnection is less than about 3 dB.

5. The fiber sensor package of claim 1, wherein the first optical fiber is a sapphire fiber and the second optical fiber is a silica fiber.

6. The fiber sensor package of claim 1, wherein the bonding material is a high-temperature ceramic material.

7. The fiber sensor package of claim 1, wherein the bonding material is a mixture of a ceramic material and a metallic material.

8. The fiber sensor package of claim 1, wherein the bonding material is a ceramic metal composite with particle sizes ranging from about 0.1 microns to about 2 microns.

9. The fiber sensor package of claim 1, wherein the tubing comprises an alloy comprising platinum and rhenium.

10. The fiber sensor package of claim 1, wherein the tubing comprises an alloy comprising rhenium and iridium.

11. The fiber sensor package of claim 1, wherein the tubing is hermetically sealed.

12. The fiber sensor package of claim 1, wherein the tubing is filled with a gaseous medium selected from the group consisting of air, nitrogen, argon and combinations thereof.

13. A coal gasification system comprising the sensing cable package of claim 1.

14. A radiant syngas cooler system comprising the fiber sensing cable package of claim 1.

15. A method of forming a sensing cable package comprising:

contacting a first optical fiber and a second optical fiber to form an interconnection;

providing a tubing with an aperture at the vicinity of the intersection and the tubing comprising one or more noble metals, wherein the tubing circumferentially surrounds at least a length of the first and second optical fibers and the interconnection;

disposing a bonding material through the aperture into the tubing to span across at least part of the circumferential surfaces of the first and second fibers along the interconnection; and setting the bonding material to form a rigid interconnection of the first and second fibers such that fibers on each side of the bonding material can freely move towards opposite directions as a result of thermal expansion.

16. The method of claim 15, wherein the tubing is introduced to further surround the first fiber at an end comprising at least one FBG.

17. The method of claim 15, wherein the bonding material is introduced at a temperature greater than about 3000° F. (1648.8° C.).

18. The method of claim 15, wherein the bonding material is introduced inside the tubing in a putty form, followed by a thermal curing process.

19. A gasification system comprising:
a gasifier unit and an RSC; and
a sensor cable package at least in part disposed within the gasification system, comprising:
a sapphire optical fiber sensing cable comprising a core having an index of refraction n1, wherein the core comprises at least one Bragg grating structure; and
a sapphire nanoporous cladding along a circumferential surface of the fiber comprising nanopores filled with a medium; and
a silica optical fiber abutting the sapphire optical fiber, wherein abutting portions of the sapphire and silica optical fibers are disposed within a tubing comprising one or more noble metals and an aperture on the tubing at the vicinity of the intersection, wherein a bonding material is disposed within the tubing through the aperture spanning across the abutting portions around at least a part of the circumferential surfaces and bonding in place the sapphire fiber and the silica fiber such that fibers on each side of the bonding material can freely move towards opposite directions as a result of thermal expansion, wherein the tubing is hermetically sealed and the at least one Bragg grating structure is disposed within the tubing.

20. The gasification system of claim 19, operable at temperatures of 2200F (1204.4° C.) or greater, and a pressure of 700 psi (4.82 MPa) or greater.

* * * * *